(12) United States Patent
Szekely et al.

(10) Patent No.: US 9,284,102 B2
(45) Date of Patent: *Mar. 15, 2016

(54) DISPENSER AND METHODS

(71) Applicant: Plastek Industries, Inc., Erie, PA (US)

(72) Inventors: Alex S. Szekely, Jackson, NJ (US);
Richard H. Seager, North Stonington, CT (US); Timothy C. Dzurik, Erie, PA (US)

(73) Assignee: Plastek Industries, Inc., Erie, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,849

(22) Filed: Apr. 25, 2014

(65) Prior Publication Data

US 2014/0224827 A1   Aug. 14, 2014

Related U.S. Application Data

(63) Continuation-in-part of application No. 13/643,318, filed as application No. PCT/US2012/020471 on Jan. 6, 2012, now Pat. No. 8,752,738.

(60) Provisional application No. 61/430,511, filed on Jan. 6, 2011, provisional application No. 61/816,368, filed on Apr. 26, 2013.

(51) Int. Cl.
*G01F 11/28* (2006.01)
*B65D 47/26* (2006.01)
*G01F 11/26* (2006.01)

(52) U.S. Cl.
CPC ............ *B65D 47/268* (2013.01); *G01F 11/262* (2013.01); *Y10T 29/49826* (2015.01)

(58) Field of Classification Search
CPC ......... G01F 11/20; G01F 11/22; G01F 11/24; G01F 11/26; G01F 11/261; G01F 11/262; G01F 11/263; G01F 11/42; G01F 11/44; G01F 11/46; B65D 47/265; B65D 47/268

USPC .............. 222/42, 47, 48, 355, 365, 367, 426, 222/427, 428, 429, 443, 450, 451, 452, 454, 222/455

See application file for complete search history.

(56) References Cited

U.S. PATENT DOCUMENTS 614,646 A   11/1898  Cloud
1,586,781 A   6/1926  Case et al.
(Continued)

FOREIGN PATENT DOCUMENTS

DE     3416008 A1   10/1985
JP     11105950      4/1999
(Continued)

OTHER PUBLICATIONS

International Search Report and Written Opinion for PCT/US2012/020471, dated Aug. 22, 2012.
(Continued)

*Primary Examiner* — Patrick M Buechner
(74) *Attorney, Agent, or Firm* — Bachman & LaPointe, P.C.

(57) ABSTRACT

A chamber body is mounted to the bottle body and has an opening and partially bounds a first chamber and a second chamber. A selector is mounted to the chamber body for relative rotation between a first dosing condition and a second dosing condition. In the first dosing condition: flow is not blocked from the first chamber out the opening; flow is blocked from the second chamber out the opening; flow is blocked from the bottle interior to the first chamber; and flow is not blocked from the bottle interior to the second chamber. In the second dosing condition: flow is blocked from the first chamber out the opening; flow is not blocked from the second chamber out the opening; flow is not blocked from the bottle interior to the first chamber; and flow is blocked from the bottle interior to the second chamber.

20 Claims, 19 Drawing Sheets

(56) References Cited

U.S. PATENT DOCUMENTS

| | | |
|---|---|---|
| 1,914,766 A | 6/1933 | Zaloschan |
| 2,877,937 A | 3/1959 | Weir |
| 3,130,874 A | 4/1964 | Bulmer |
| 3,866,805 A | 2/1975 | Hamilton, Jr. |
| 4,120,432 A | 10/1978 | Fuchs |
| 4,143,794 A | 3/1979 | Stratford et al. |
| 4,429,815 A | 2/1984 | Libit |
| 5,601,213 A | 2/1997 | Daniello |
| 6,948,641 B1 | 9/2005 | Williams |
| 8,752,738 B2 * | 6/2014 | Szekely et al. ............... 222/426 |

FOREIGN PATENT DOCUMENTS

| | | |
|---|---|---|
| JP | 2006021779 A | 1/2006 |
| KR | 1020030027931 | 4/2003 |
| KR | 2020090001976 | 3/2009 |

OTHER PUBLICATIONS

Anonymous: "Polyethylene—Wikipedia, the free encyclopedia", Dec. 29, 2010, Retrieved on Feb. 16, 2015 from the Internet: URL:http://en.wikipedia.org/w/index.php?title=Polyethylene&oldid=404781251.

Anonymous: "Plastipedia: The Plastics Encyclopedia—Injection Moulding", Dec. 31, 2010, Retrieved on Feb. 16, 2015 from the Internet: URL:https://web.archive.org/web/20101231053457/http://www.bpf.co.uk/plastipedia/processes/injection_moulding.aspx.

Extended European Search Report for European Patent Application No. 12732366.5, dated Mar. 4, 2015.

* cited by examiner

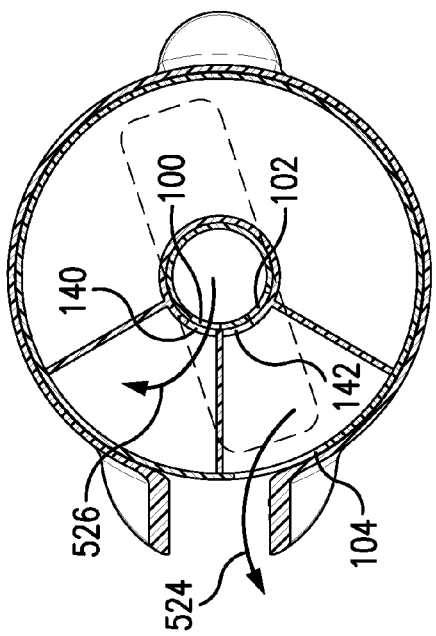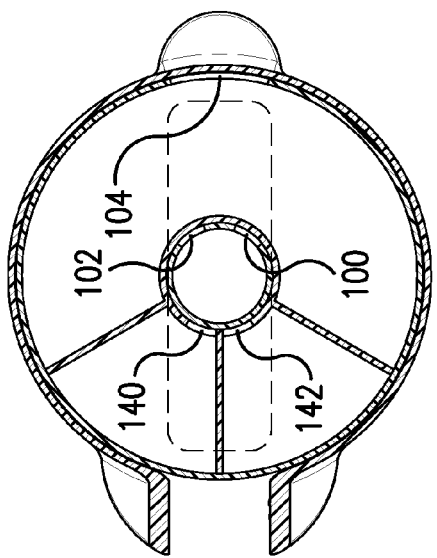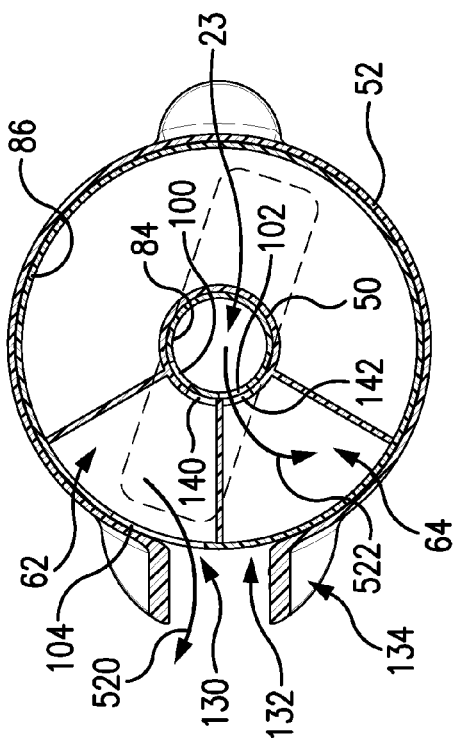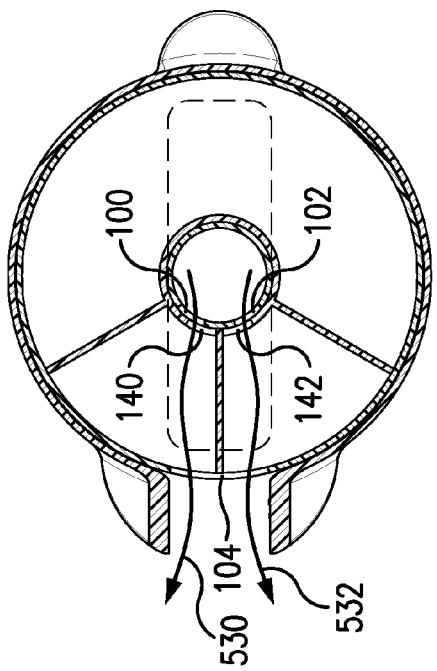

DISPENSER AND METHODS

CROSS-REFERENCE TO RELATED APPLICATIONS

This is a continuation in part of U.S. patent application Ser. No. 13/643,318, national stage filed Oct. 25, 2012 which is the US national stage of International Patent Application No. PCT/US12/20471, filed Jan. 6, 2012, which claims benefit of U.S. Patent Application Ser. No. 61/430,511, filed Jan. 6, 2011 and this application claims benefit of U.S. Patent Application Ser. No. 61/816,368, filed Apr. 26, 2013, and all entitled "Dispenser and Methods", the disclosures of which are incorporated by reference herein in their entireties as if set forth at length.

BACKGROUND OF THE INVENTION

The invention relates to dispensing of home and garden granules/powders and liquids (flowable materials) such as detergents, fabric softeners, insecticides, fertilizers and the like. More particularly, the invention relates to dosing bottles.

Exemplary flowable materials are laundry detergent, fabric softener, and home and garden chemicals (e.g., fertilizers, pesticides, insecticides).

Conventionally in such fields, dosing may be achieved via providing a combined cap and measuring cup. Exemplary such caps/cups have installed conditions screwed onto a spout fitment to close/seal a bottle.

In other fields, a number of dosing bottles or other containers have been proposed. These include U.S. Pat. No. 1,914,766 of Zaloschan and U.S. Pat. No. 2,877,937 of Weir.

SUMMARY OF THE INVENTION

One aspect of the invention involves an apparatus comprising a bottle body having an interior for storing a flowable material. A chamber body is mounted to the bottle body and has an opening and a spout and partially bounds a first chamber and a second chamber. A selector is mounted for relative rotation to the chamber body between a first dosing condition and a second dosing condition. In the first dosing condition: flow is not blocked from the first chamber out the opening; flow is blocked from the second chamber out the opening; flow is blocked from the bottle interior to the first chamber; and flow is not blocked from the bottle interior to the second chamber. In the second dosing condition: flow is blocked from the first chamber out the opening; flow is not blocked from the second chamber out the opening; flow is not blocked from the bottle interior to the first chamber; and flow is blocked from the bottle interior to the second chamber.

In an exemplary method of use, this would allow for the second chamber to be filled while the first chamber is dispensing and vice versa. This would occur during a single inclination (or partial inverting) of the bottle. In this example, the first time the system is inclined the filling of the second chamber would be all that occurs. In this example, the first chamber cannot pour out as it will be empty after the system is switched from a shipping mode. The user will be required to operate the selector which will switch the out flow action to the chamber that was filled during the last inclination. This same selector also opens the internal gate, allowing the chamber last emptied to be filled from the bottle.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 10 is an upward sectional view of the dispenser in the first dispensing condition, taken along the same cut plane as FIG. 12 below.

FIG. 11 is an upward sectional view of the dispenser in the second dispensing condition taken along the same cut plane.

FIG. 12 is an upward sectional view of the dispenser in the free-pouring condition taken along line 12-12 of FIG. 5.

FIG. 13 is an upward sectional view of the dispenser in the closed condition taken along that same cut plane.

Like reference numbers and designations in the various drawings indicate like elements.

DETAILED DESCRIPTION

Figure 1:
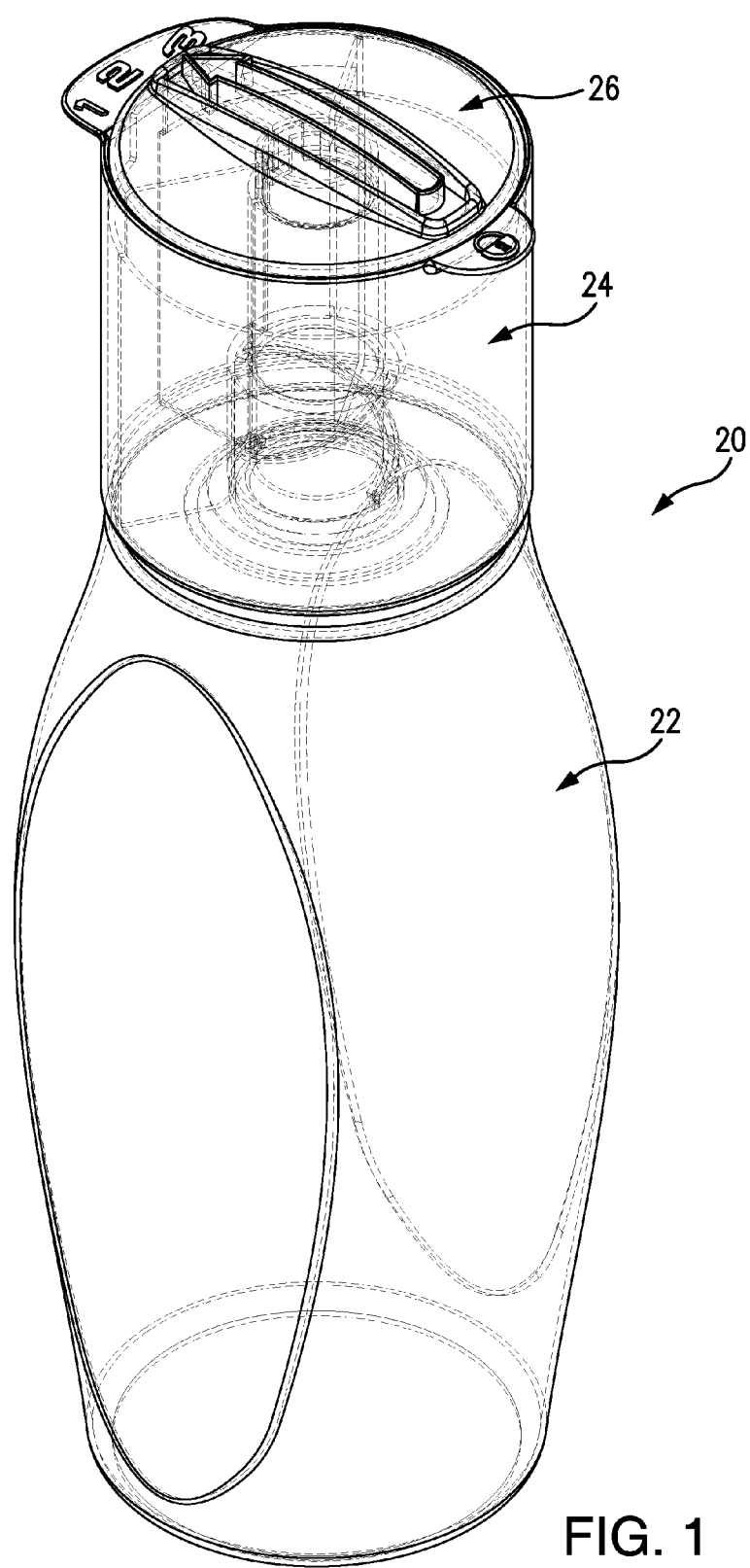
FIG. 1 is an x-ray perspective view of a dispenser in a free-pouring condition.

The FIGS. are views of an exemplary dispenser 20 formed as a three piece system of a bottle body 22 having an interior 23; a dispensing/dosing chamber body member 24; and a selector formed as a cover/closure/actuator 26.

Exemplary bottle body, chamber body, and selector materials are molded plastics such as various polyethylenes and polypropylenes.

An exemplary bottle body (injection blow molded) 22 has a neck 28 extending upward from a shoulder 29 about a central longitudinal/vertical axis 500 to a rim 30 defining an open mouth 32. The neck has an external thread 34 (or other feature) for mounting the chamber body member. The exemplary thread 34 is a double lead thread. An exemplary chamber body member (injection molded) screws onto the bottle neck/mouth and may lock with a lug or detent (not shown) thereon to prevent counter-rotation and extraction.

The exemplary chamber body member 24 comprises concentric inner 50 and outer 52 walls (annular sidewalls) joined by a lower annular bottom wall 54 and three vertical radial vanes 56, 58, 60 therebetween to define two dispensing chambers 62, 64. The inner and outer walls each have an associated inboard (inner diameter (ID)) surface and outboard (outer diameter or (OD)) surface. The exemplary inner wall ID surface may bear a feature 66 (e.g., a double helical channel) for engaging the thread 34. As is discussed further below, the first and second chambers 62 and 64 have respective inlet ports (inlets or inlet openings) and respective outlet ports (outlets or outlet openings).

An exemplary selector 26 (injection molded) snaps onto the chamber body and is held for rotation via a complementary axial detenting or locking mechanism (e.g., an annular rib and channel arrangement 92, 94 (FIG. 3) discussed below). A rotational detent mechanism (not shown) may be provided (e.g., on the rib/channel) for detenting the selector in one or more conditions/orientations (such as some or all of the four conditions mentioned below).

An indicator 80, such as an arrow (e.g., molded to the upper web 82 of the selector), may indicate the particular condition.

Figure 3:
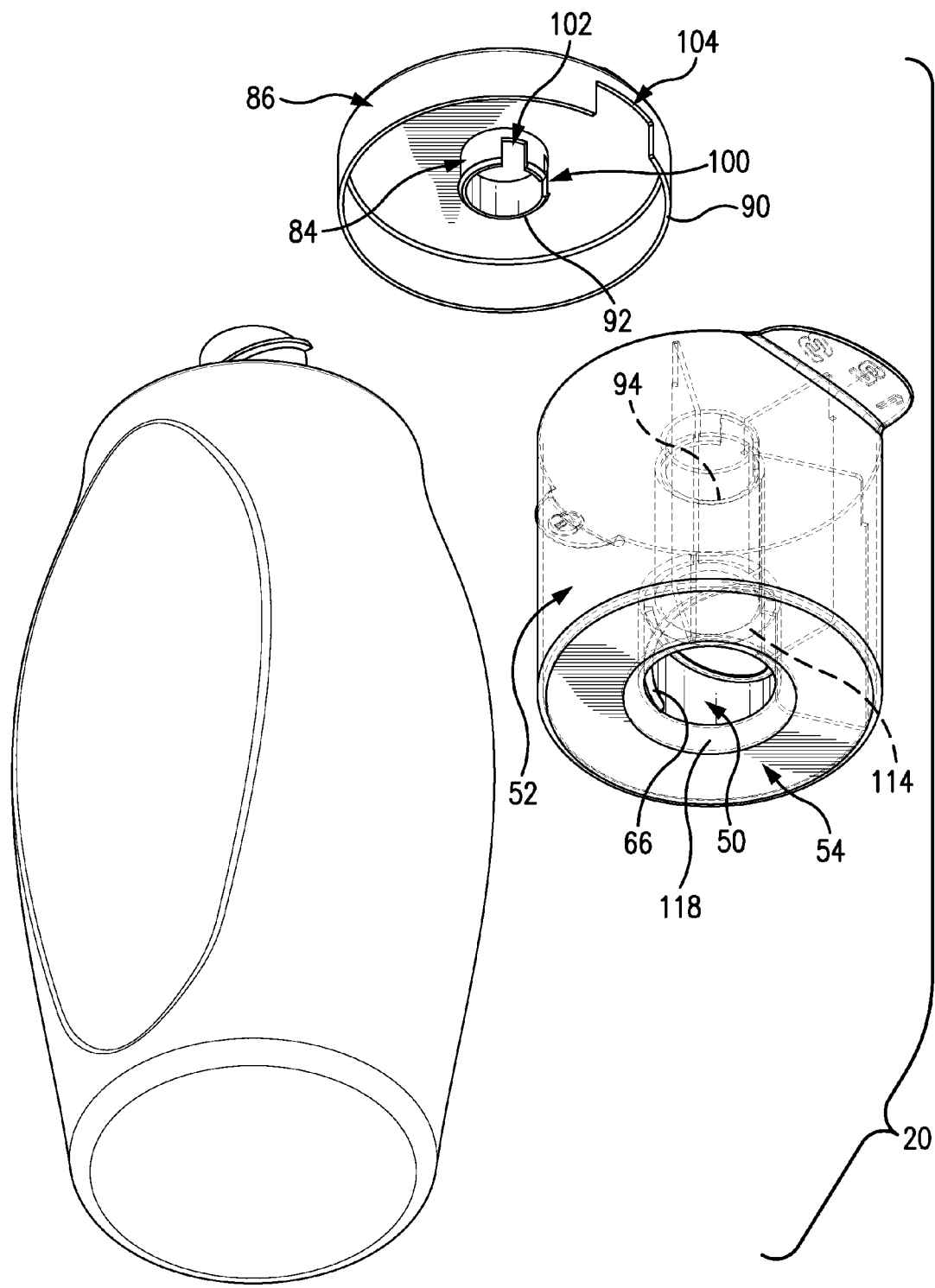
FIG. 3 is a second exploded perspective view of the dispenser of FIG. 1 with chamber body in x-ray.
Figure 4:
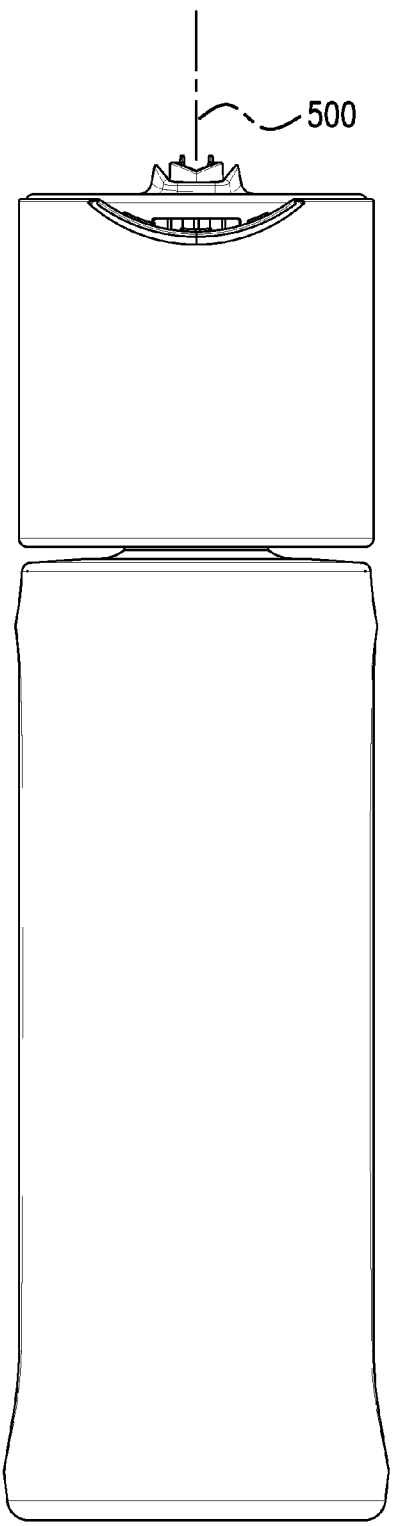
FIG. 4 is a front view of the dispenser of FIG. 1.
Figure 5:
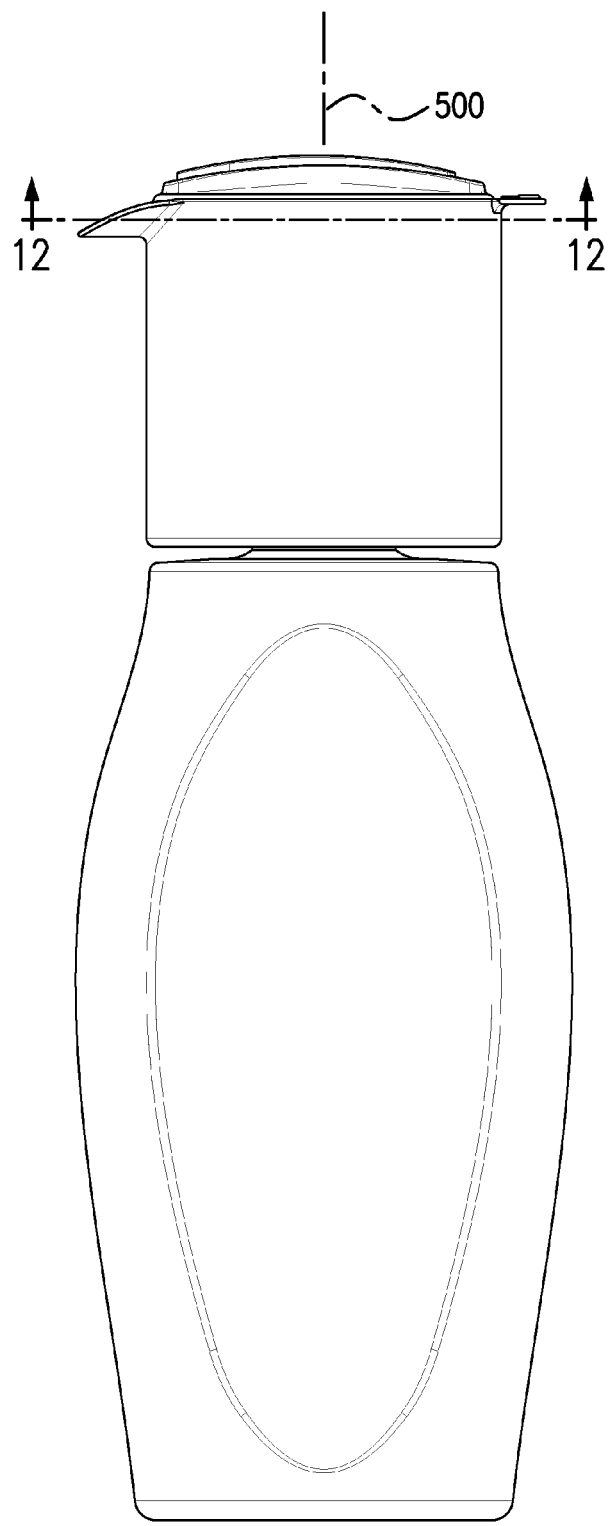
FIG. 5 is a side view of the dispenser of FIG. 1.

Exemplary dose volume is one fluid ounce (30 ml), more broadly 15-75 ml. Exemplary bottle interior volume is about 32 fluid ounces (one liter, more broadly, 0.4-4.0 liter or 0.4-2.0 liter) (e.g. sufficient to contain that much flowable material). FIG. 3 also shows an exemplary bottle as having a sidewall extending upward to the shoulder from a base or bottom (which may support the bottle in a standing condition).

Figure 2:
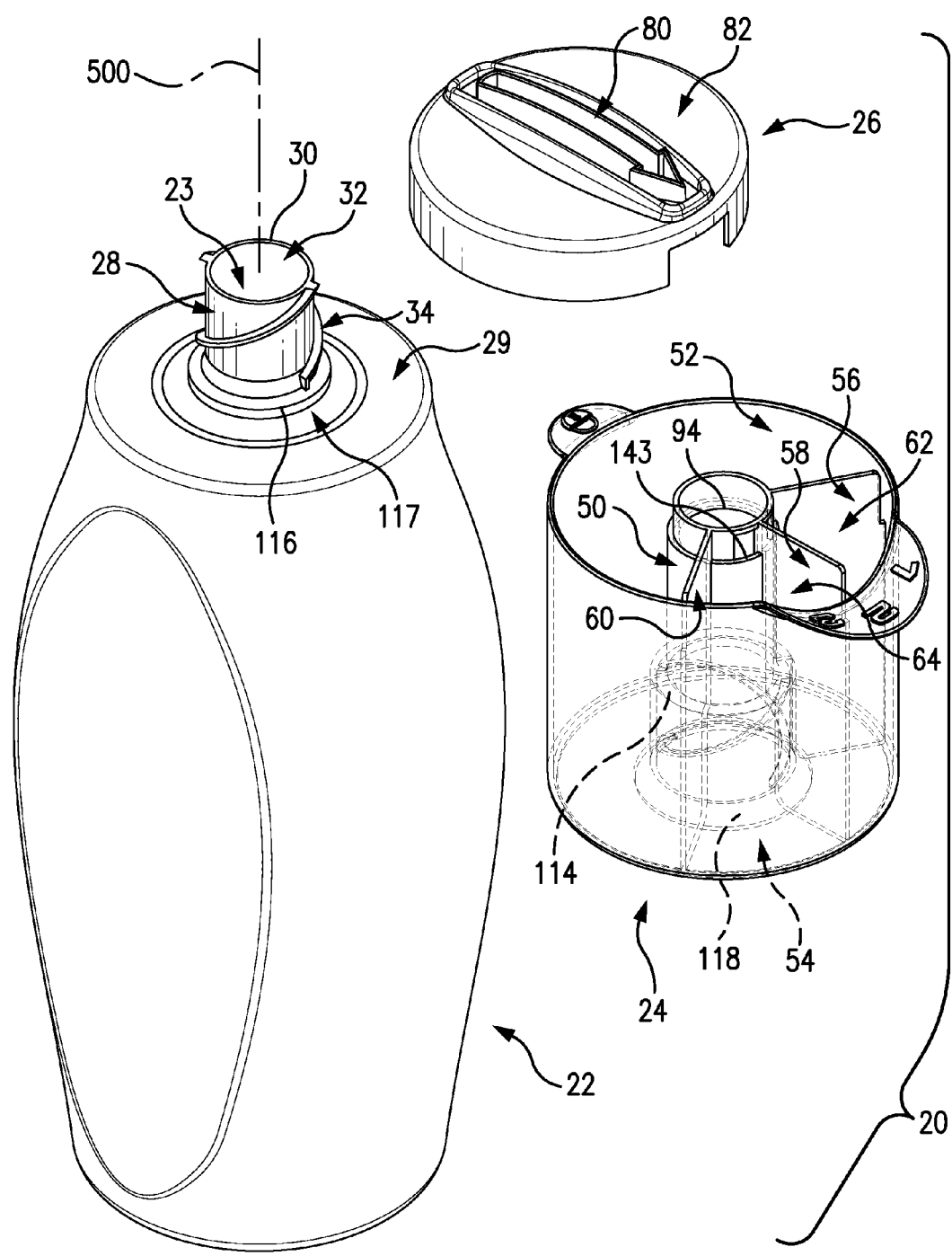
FIG. 2 is a first exploded perspective view of the dispenser of FIG. 1 with chamber body in x-ray.
Figure 6:
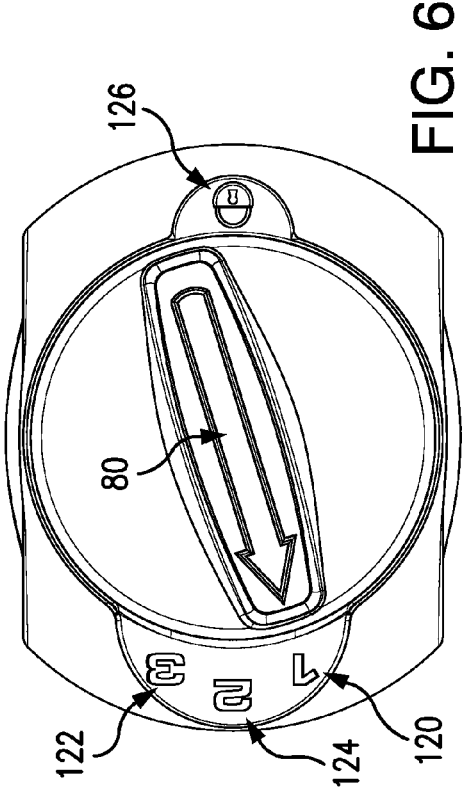
FIG. 6 is a top view of the dispenser in a first dispensing condition.
Figure 7:
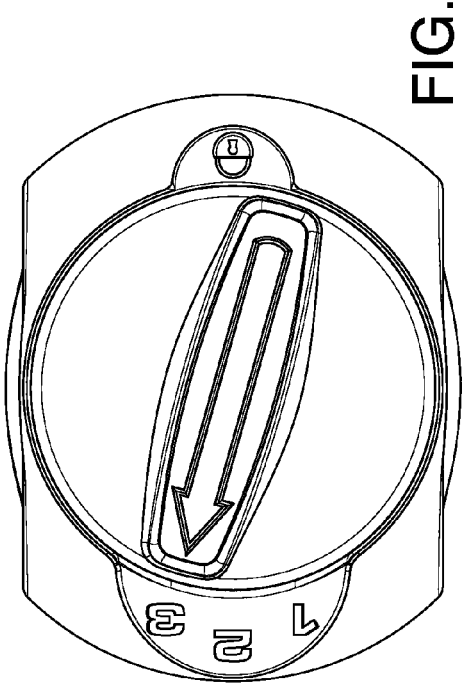
FIG. 7 is a top view of the dispenser in a second dispensing condition.
Figure 8:
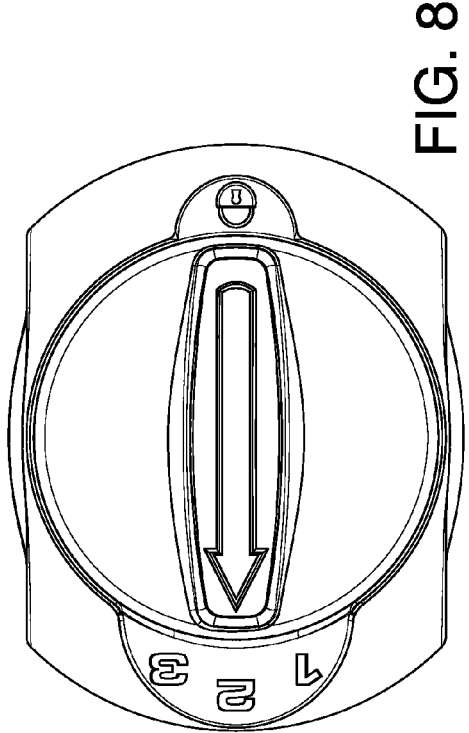
FIG. 8 is a top view of the dispenser in the free-pouring condition.
Figure 9:
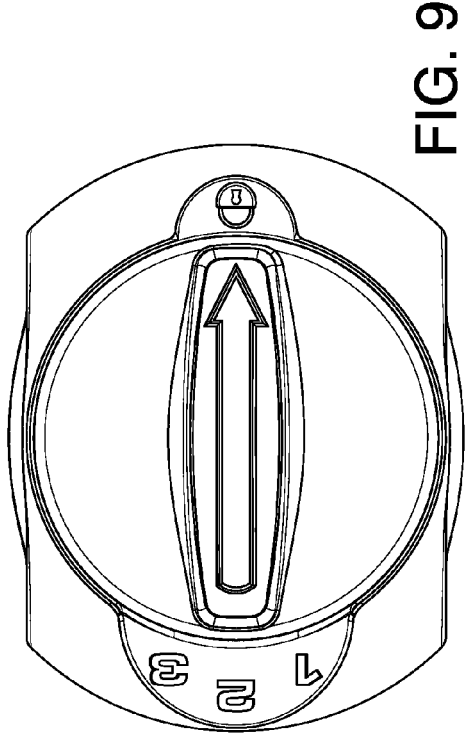
FIG. 9 is a top view of the dispenser in a closed condition.

The selector is mounted to the chamber body for exemplary relative rotation about the axis 500 between a first dosing condition (FIGS. 6&10); a second dosing condition (FIGS. 7&11); a free-pouring condition (FIGS. 8&12); and a closed condition (FIGS. 9&13). The exemplary selector comprises a transverse upper web 82 and concentric inner 84 (FIG. 3) and outer 86 interrupted/partial walls (annular sidewalls) depending from the web and which selectively block and unblock inlet and outlet ports (discussed below) of the dispensing chambers 62, 64 (with openings or gaps 100, 102 (in 84) and 104 (in 86) to selectively permit flow). FIG. 3 further shows a lower rim 90 of the outer wall and the aforementioned rib 92 at the lower end/rim of the inner wall 84. The rib 92 projects radially outward and is received in a channel 94 (FIG. 2) in the inboard (inner diameter (ID)) surface of the chamber body inner wall 50 (FIG. 2) to provide the axial retention while permitting rotation of the selector relative to the chamber body member.

For providing a seal (a double seal) of the chamber body member to the bottle body, the chamber body member and bottle body may have complementary sealing surfaces which engage each other in the installed condition. A first sealing surface of the container body is formed by the rim 30. Its complementary first sealing surface of the chamber body member is formed by the underside 114 of an internal shoulder in the inner sidewall 50 between a relatively smaller diameter upper portion and a relatively larger diameter lower portion (along which lower portion the internal thread or channel 66 is formed).

An exemplary second sealing feature of the bottle body comprises the annular corner 116 of an annular boss or protrusion 117 at the junction of a lower portion of the neck 28 and an inboard portion of the shoulder 29. In the installed condition, the corner 116 engages a complementary surface 118. The exemplary surface 118 is formed along a convex bevel between the lower surface of the bottom wall 54 and the ID surface of the inner wall 50 of the chamber body.

FIGS. 6-9 show the indicator 80 (e.g., as an arrow) as part of indicator means which further include indicia 120, 122, 124, and 126 on the chamber body member indicating the respective conditions. Other indicia may be used and the system may be reversed with individual indicia on the selector and a single indicator on the chamber body.

Whereas FIGS. 6-9 are viewed downward, corresponding FIGS. 10-13 are viewed upward thus circumferential directions appear reversed.

Each of the two chambers 62 and 64 has an outlet opening 130, 132 in an upper portion of the outer sidewall 52. In the exemplary embodiment, these two openings form adjacent halves of a single larger opening along a spout 134. In the exemplary embodiment, the indicia 120, 124, and 122 are formed along an upper (pouring) surface of the spout. Along the inner wall 50 each of the two chambers has a respective inlet opening (port) 140, 142. These may be fully internal windows or may be recesses extending downward from a rim of the wall 50. FIG. 10 also shows the aforementioned openings 100, 102 in the inner wall 84 of the selector.

In the first dosing condition: flow 520 is not blocked from the first chamber out the opening (e.g., the selector does not block an outlet port 130 of the first chamber at the side of the central vane); flow is blocked from the second chamber out the opening (e.g., the selector blocks an outlet port 132 of the second chamber at the side of the central vane); flow is blocked from the bottle interior to the first chamber (e.g., port 140 is blocked by the selector inner sidewall); and flow 522 is not blocked from the bottle interior (through selector inner sidewall port/opening 102 and inlet port 142 of the second chamber) to the second chamber. Inclining or partially inverting in this condition discharges 520 the first chamber and fills 522 the second chamber. The second chamber inlet port has a lower extremity 143 (FIG. 2 as the first chamber inlet port also has) height above a bottom of the second chamber such that re-uprighting allows a partial drainback from the second chamber to the bottle interior to eliminate a slight overfilling so that the second chamber contains the exact desired dose. This drainback helps reduce variations caused by differing degrees of dispensing inclination, differing effects of the volume remaining in the bottle, etc.

In the second dosing condition (FIG. 11): flow is blocked from the first chamber out the opening; flow 524 is not blocked from the second chamber out the opening; flow 526 is not blocked from the bottle interior to the first chamber (via ports 100 and 140); and flow is blocked from the bottle interior to the second chamber (port 142 is blocked). Inclining or partially inverting in this condition discharges the second chamber and fills the first chamber. Reuprighting causes a drainback from the first chamber similar to that described above.

In the free-pouring condition (FIG. 12), flow 530, 532 is not blocked from the bottle interior, through the first and second chambers and out the opening. Inclining or partially inverting in this condition allows free-pouring from the bottle interior. Re-uprighting may leave both chambers with doses.

In the closed condition (FIG. 13), flow is blocked from the bottle interior into both the first and second chambers and is blocked from the first and second chambers out the opening. This may be an initial transport condition. After use, it may also serve as a storage condition (however, storage may also be in the last of the first dosing condition or second dosing condition).

Figure 14:
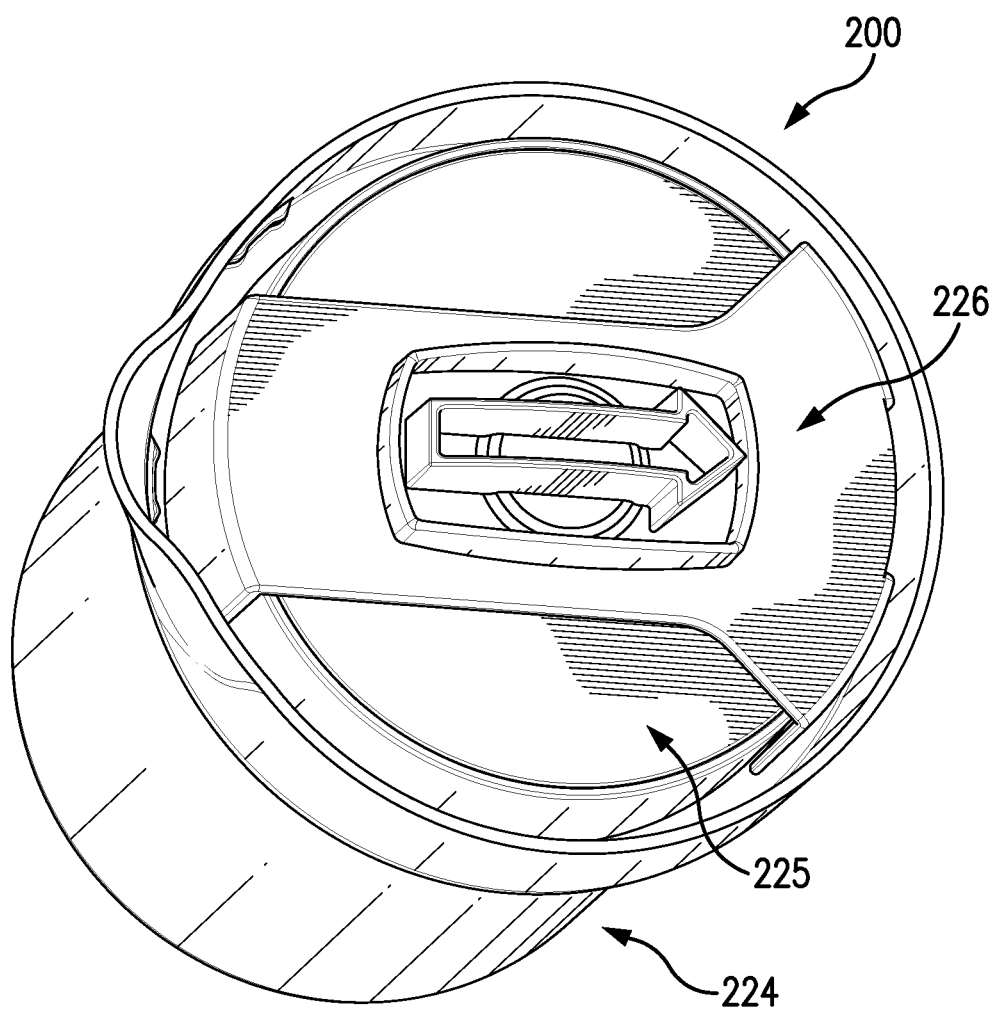
FIG. 14 is a view of a second dispensing fitment of a second dispenser in a closed (shipping/storage) condition.
Figure 20:
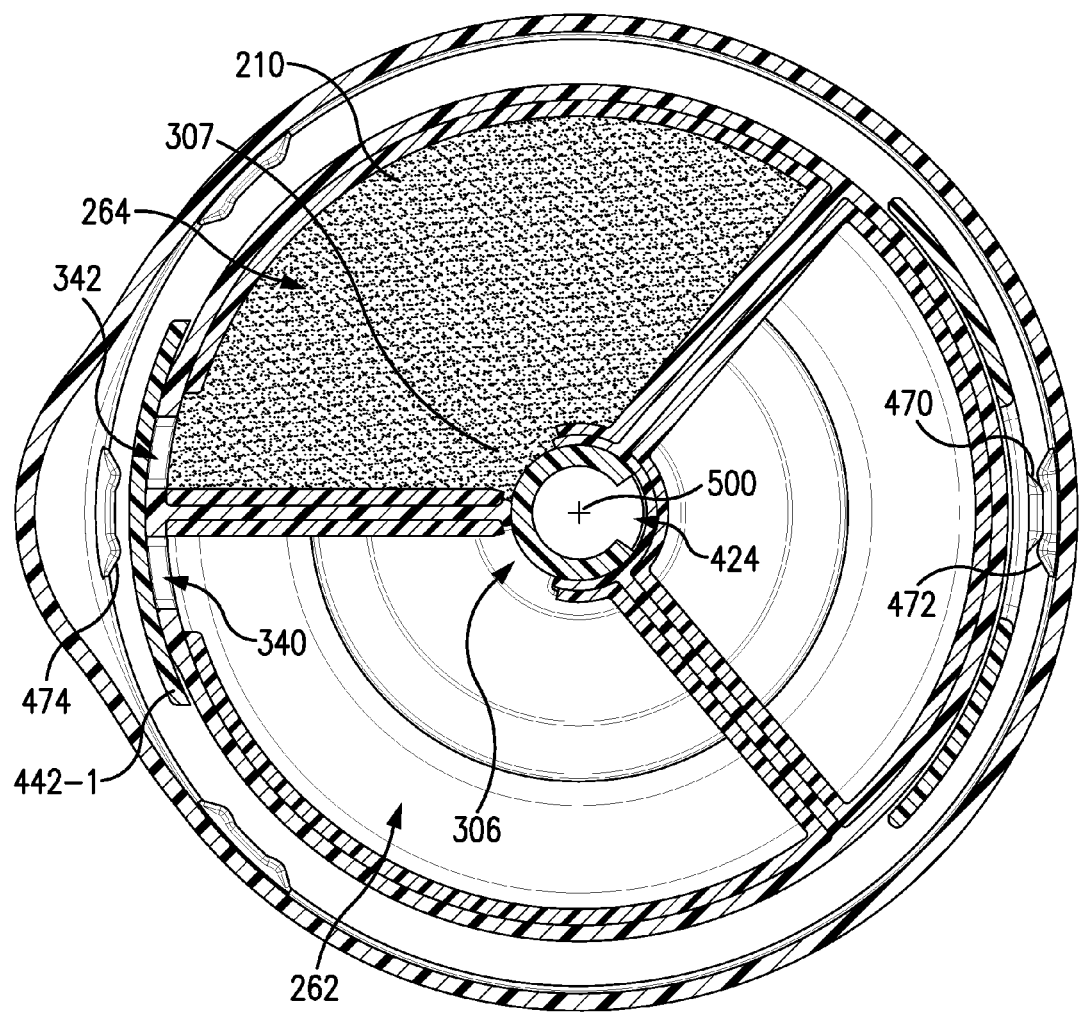
FIG. 20 is a horizontal sectional view of the second fitment taken along line 20-20 of FIG. 17.
Figure 21:
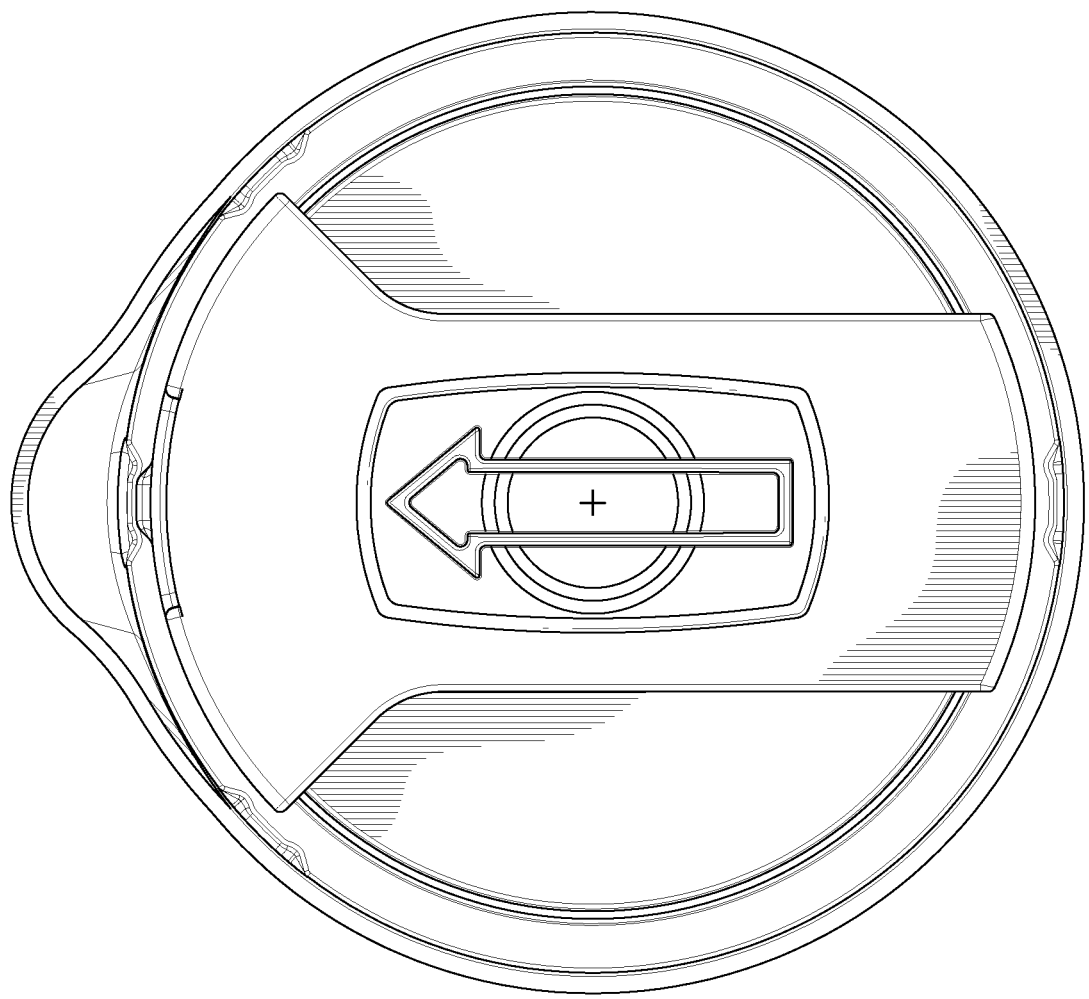
FIG. 21 is a top view of the second fitment in a free-pouring condition.
Figure 22:
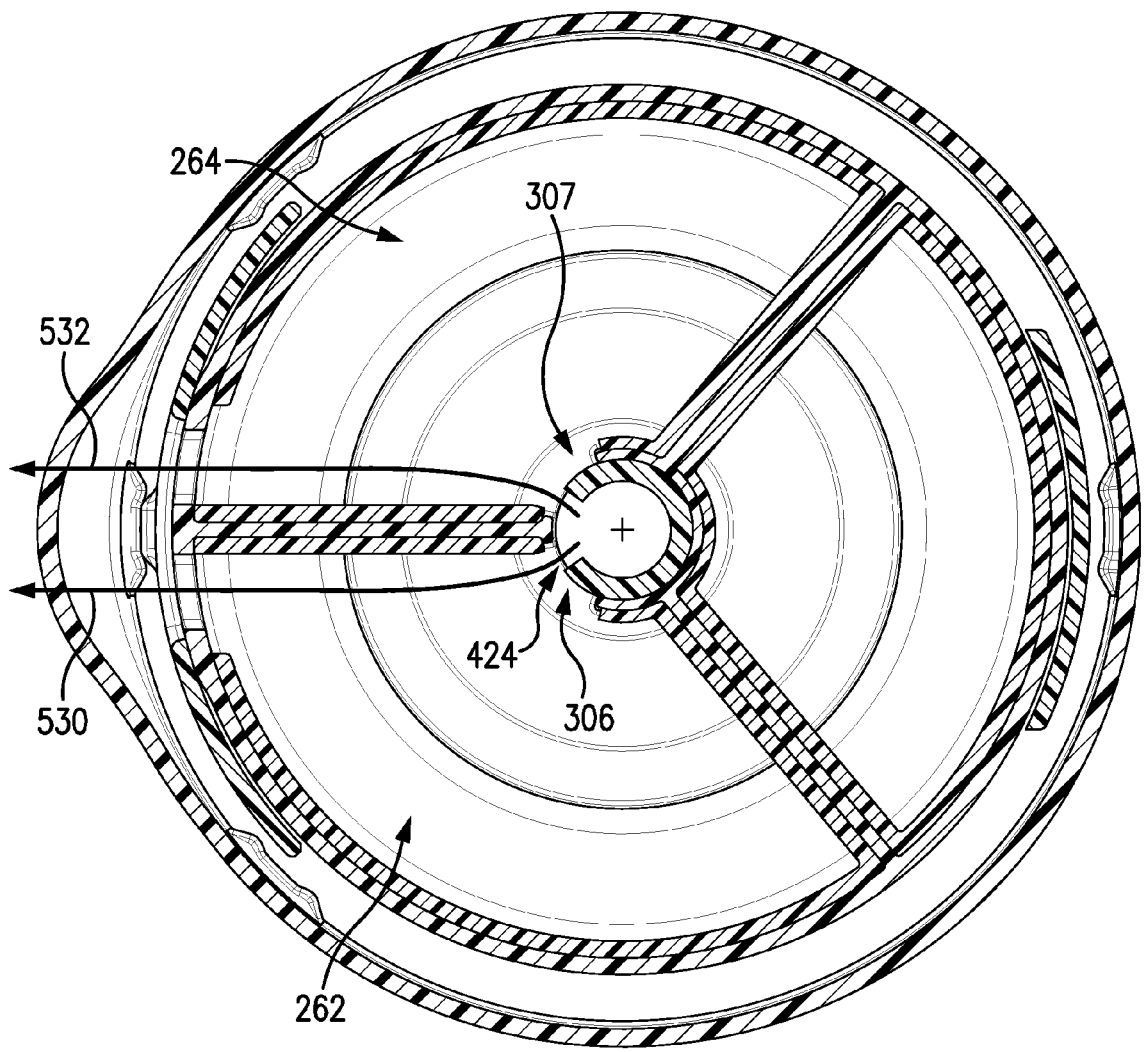
FIG. 22 is a horizontal sectional view of the second fitment in the free-pouring condition taken at the same level as FIG. 20.
Figure 23:
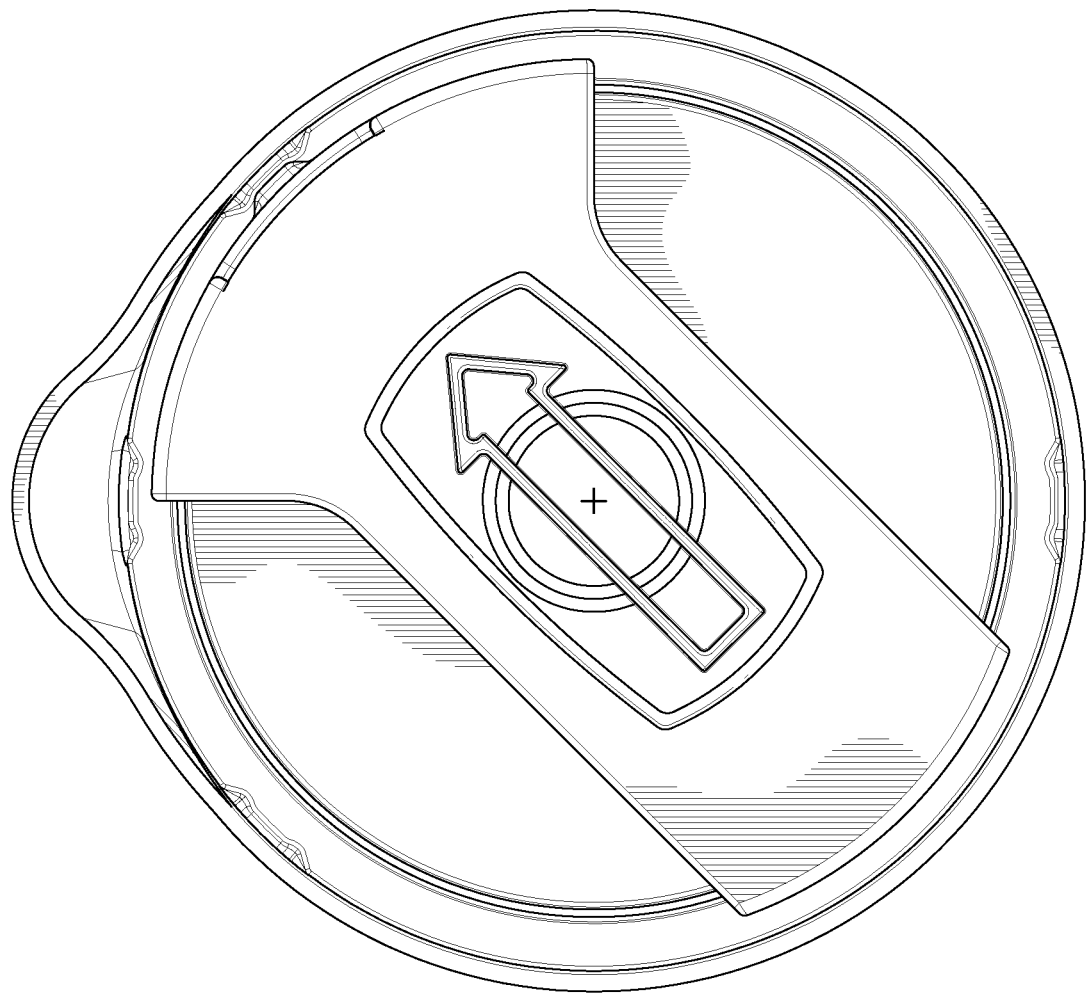
FIG. 23 is a top view of the second fitment in a dispensing condition.
Figure 24:
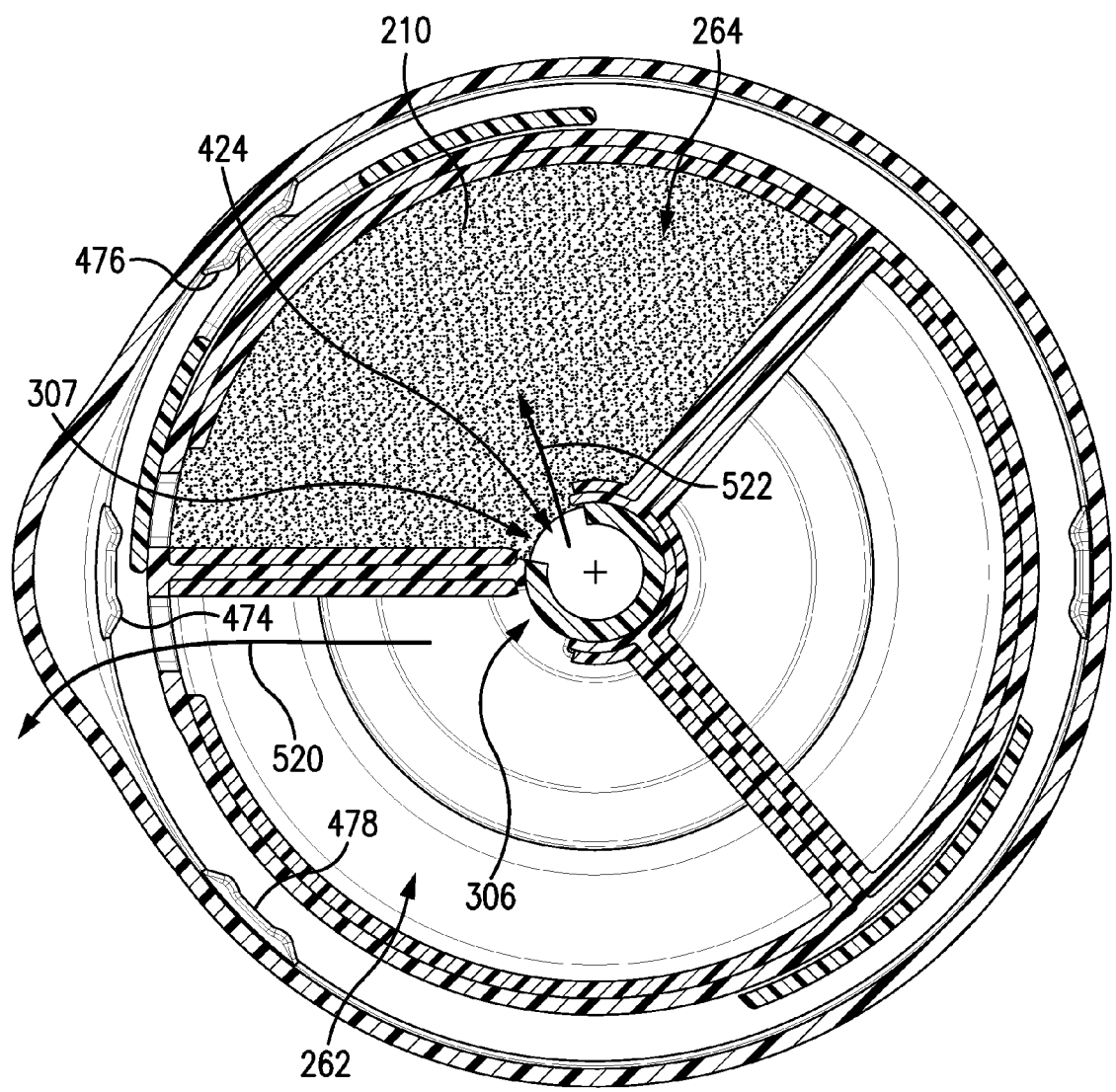
FIG. 24 is a horizontal sectional view of the second fitment in the dispensing condition taken at the same level as FIG. 20.
Figure 25:
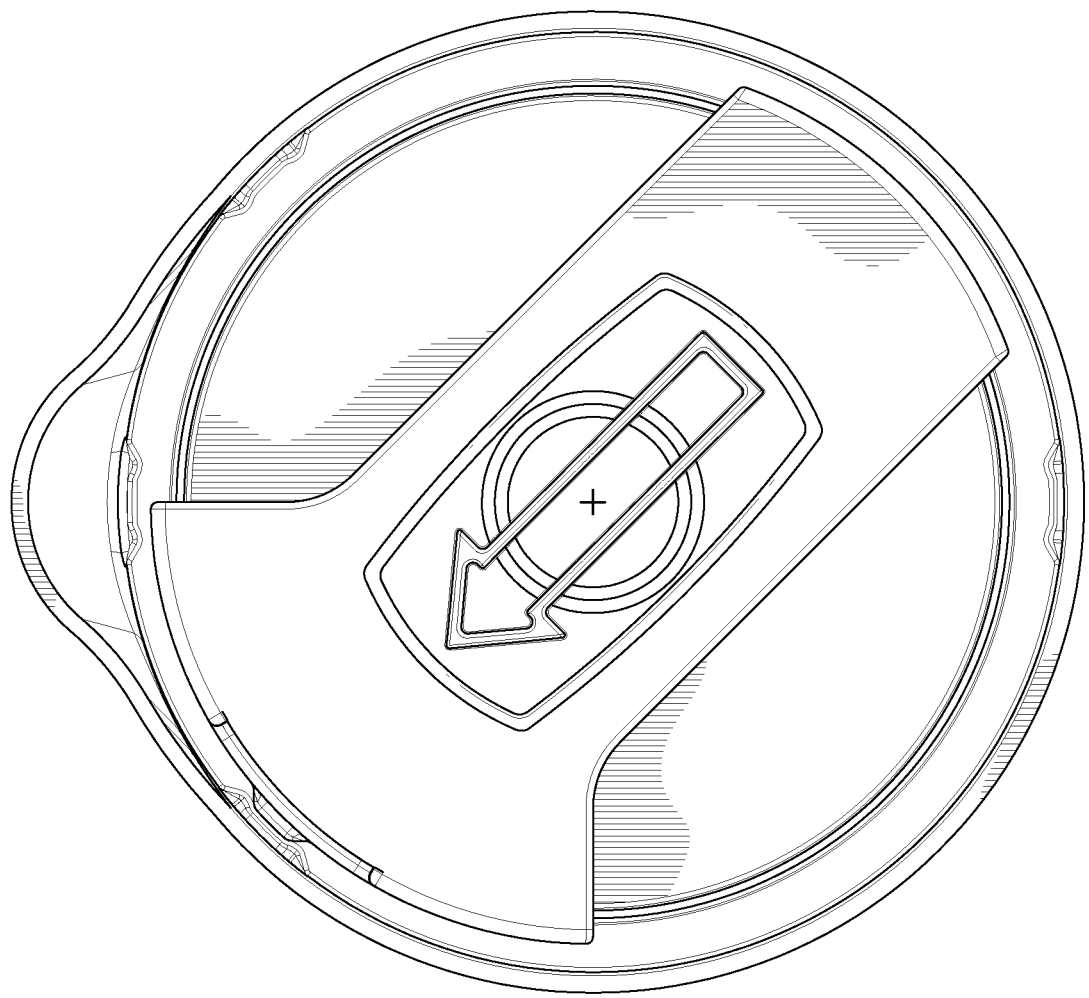
FIG. 25 is a top view of the second fitment in another dispensing condition.
Figure 26:
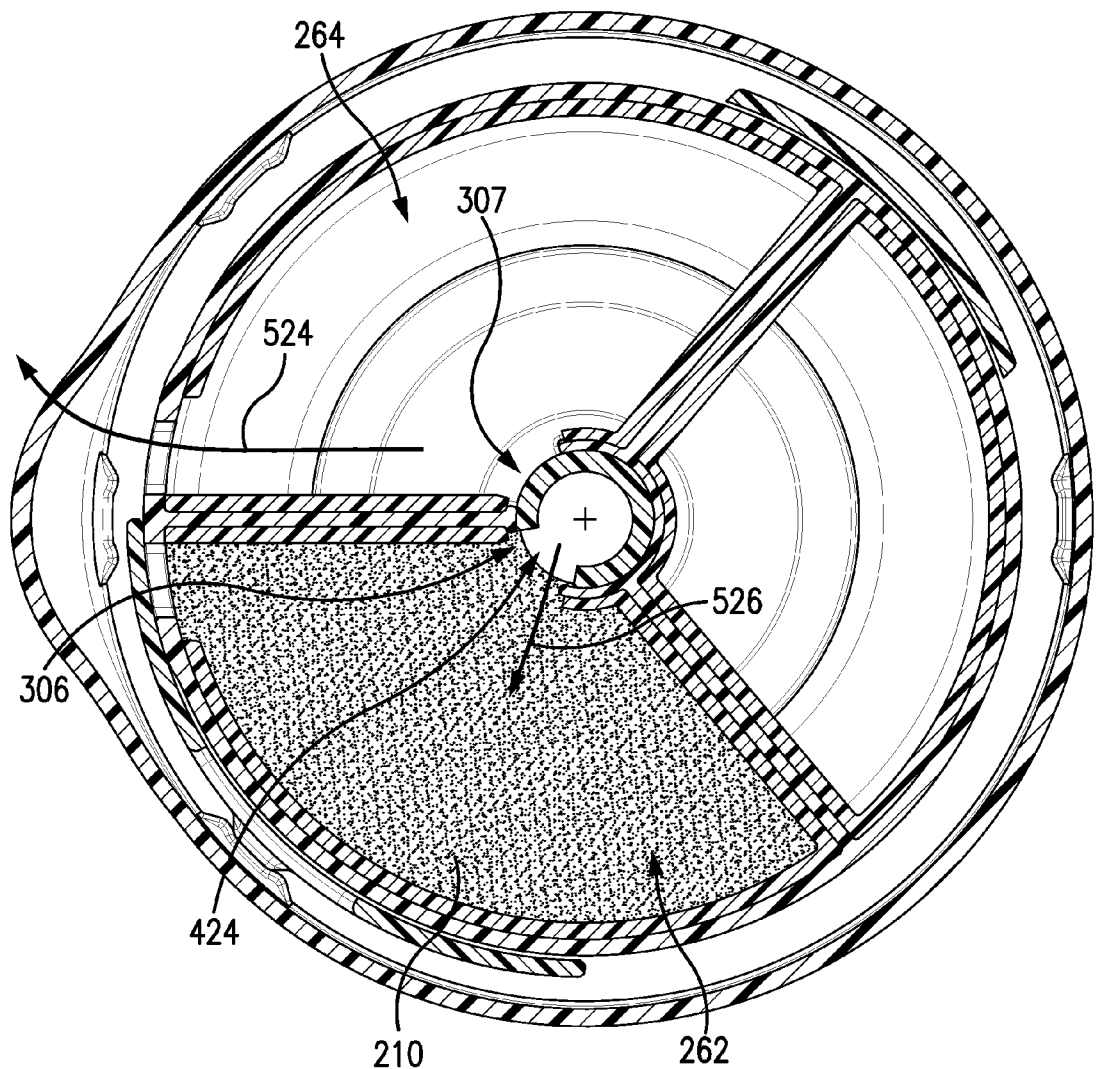
FIG. 26 is a horizontal sectional view of the second fitment in said another dispensing condition taken at the same level as FIG. 20.

FIG. 14 shows a second embodiment 200 as a three-piece/member (224, 225, 226) fitment wherein the structures and functions of the members of the two-piece fitment above are reapportioned amongst the three molded pieces. More particularly, FIGS. 14-20 show the fitment in a closed (storage/shipping) condition; FIGS. 21 and 22 show a free-pouring condition; FIGS. 23 and 24 show one dosing condition; and FIGS. 25 and 26 show another dosing condition.

The second embodiment includes a cup or body piece/member 224 having an inner wall 250 (FIG. 15), an outer wall 252, and an annular base wall 254 therebetween. Three longitudinal divider walls 256, 258, 260 separate two dispensing compartments/chambers 262, 264 and a third dead compartment/chamber 265. The inner wall may be internally threaded proximate a lower end thereof to receive a threaded neck/mouth of the mating container body. The exemplary inner wall includes a pair of ports 266, 267 respectively open to the two dispensing compartments/chambers.

Figure 15:
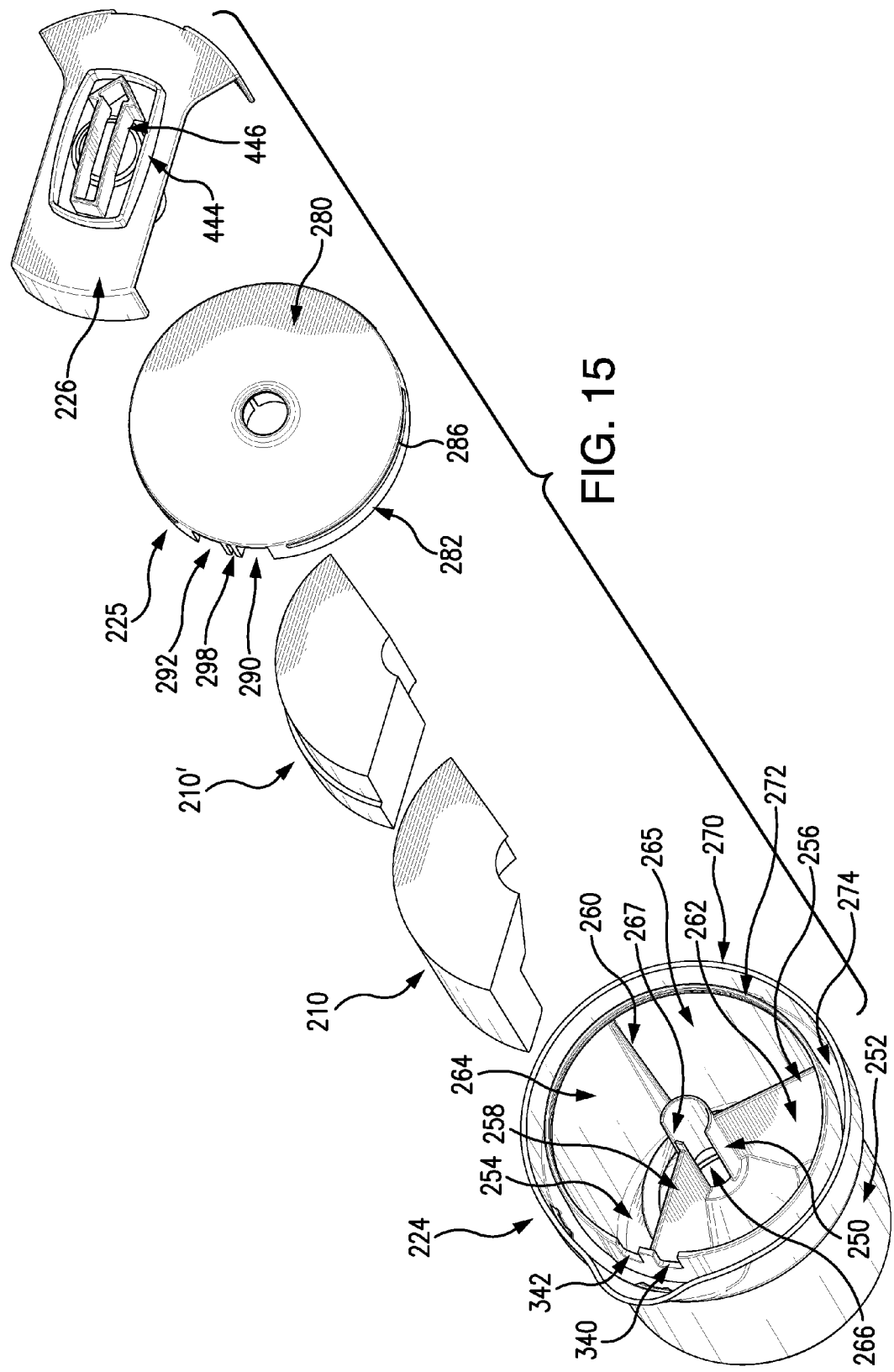
FIG. 15 is a first exploded view of the second fitment.
Figure 16:
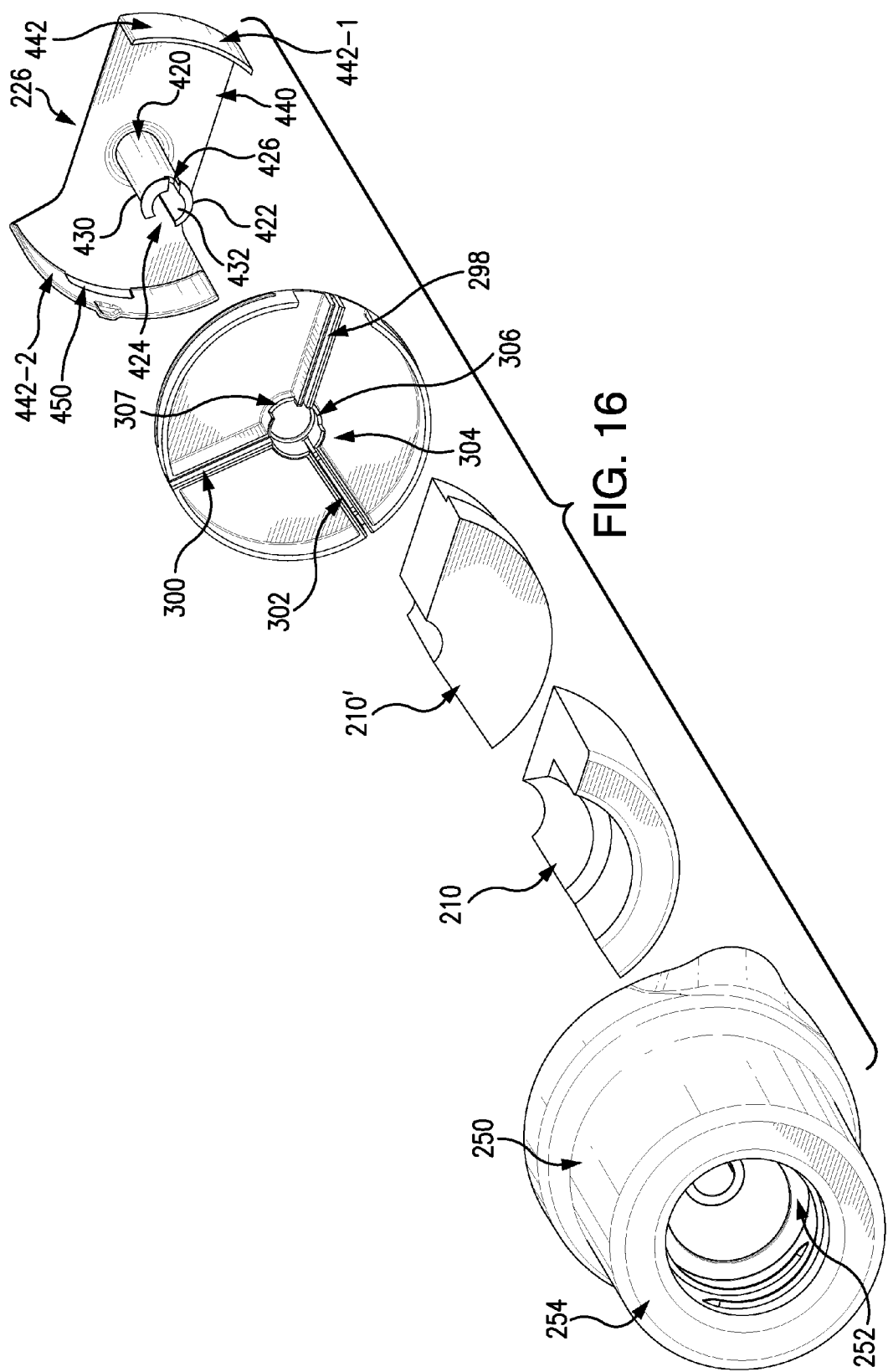
FIG. 16 is a second exploded view of the second fitment.
Figure 17:
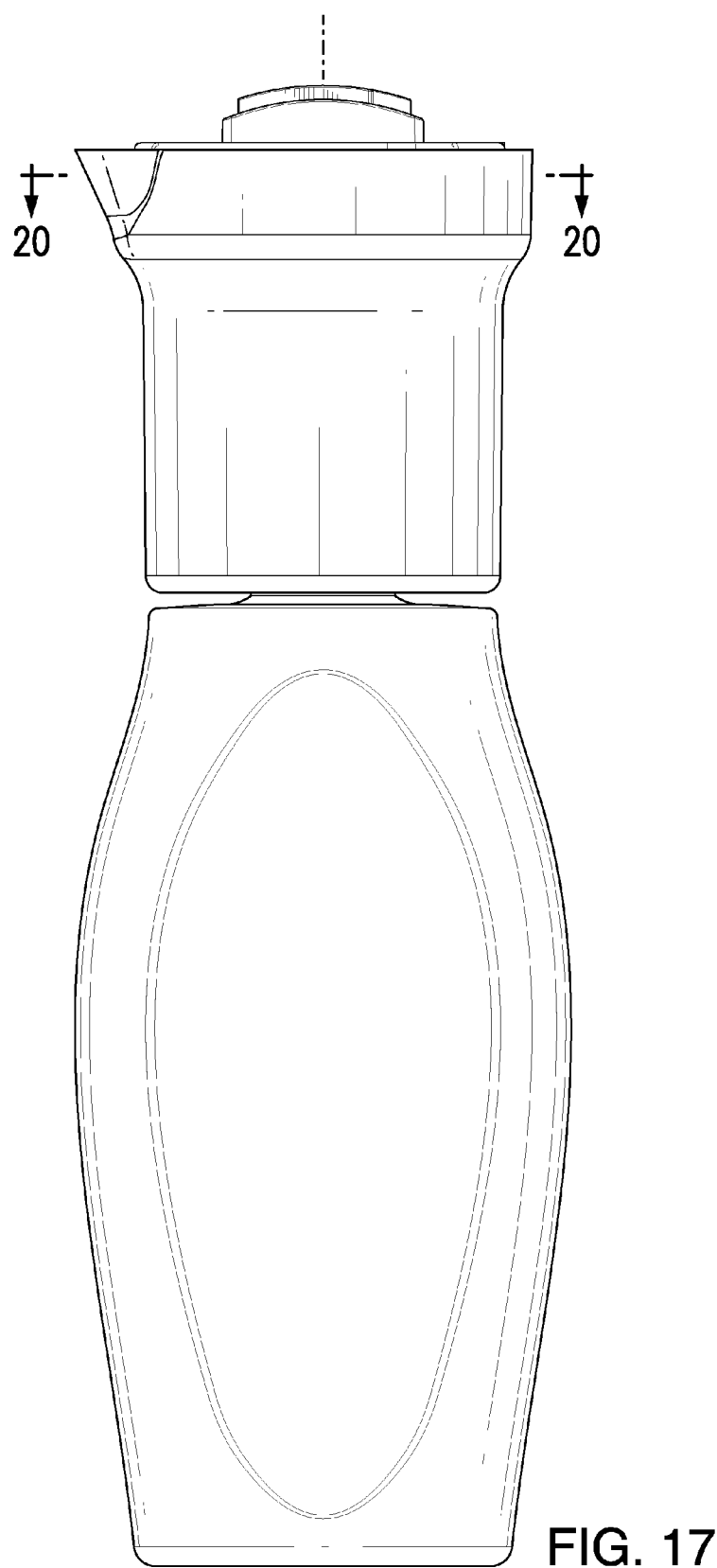
FIG. 17 is a side view of the second dispenser.
Figure 18:
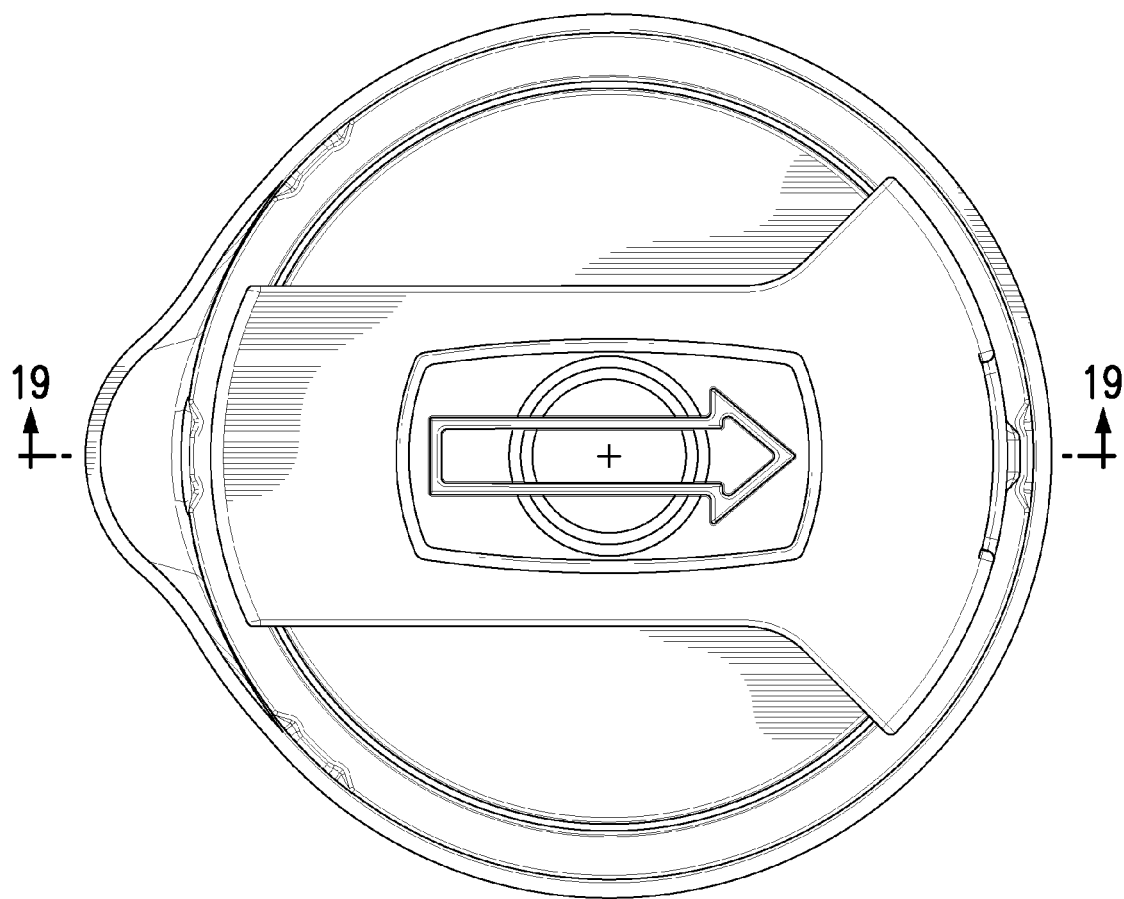
FIG. 18 is a top view of the second fitment.
Figure 19:
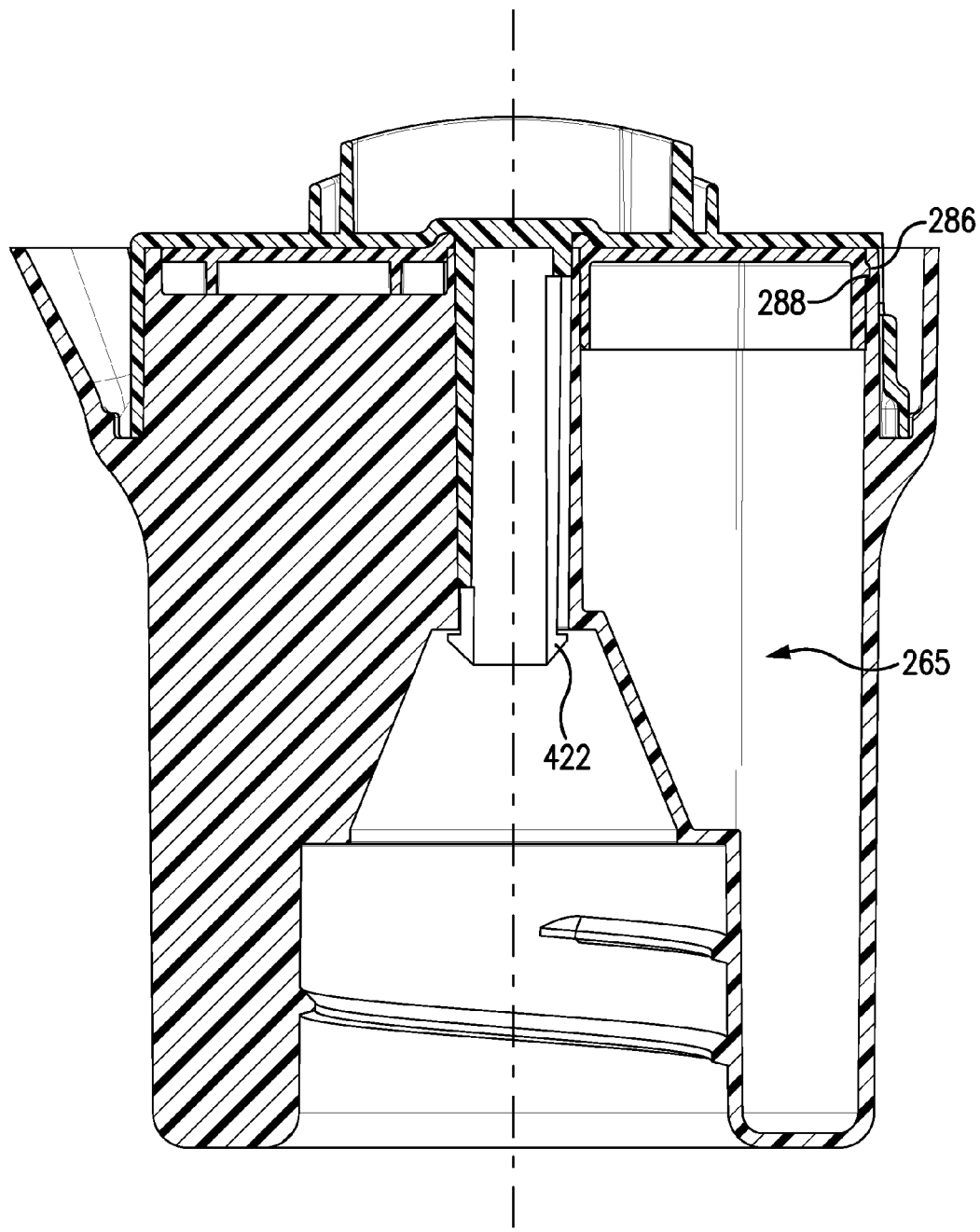
FIG. 19 is a central vertical sectional view of the second fitment taken along line 19-19 of FIG. 18.

For purposes of illustration, FIG. 15 somewhat schematically illustrates two instances 210, 210' of a dose of material in the second chamber 264. Instance 210 shows the material as if the container were upright with the material settled at the bottom of the chamber. The instance 210' shows the material as if the container is inverted.

Near the distal end/rim of the cup, the outer wall bifurcates into two portions with an outboard branch 270 extending upward from the main portion 272 and defining an annular channel 274 therebetween. In the exemplary embodiment, the main portion adjacent to the channel has a pair of ports 340, 342 respectively open to the dispensing chambers/compartments 262, 264 and separated by one of the walls (e.g., 258).

In the exemplary embodiment, a second piece 225 is a lid/cover/cap. The exemplary lid covers the annulus between the cup inner wall 250 and the cup outer wall 252 main portion 272 and may have an annular upper web 280 and a downwardly-depending outer sidewall 282. The exemplary lid outer sidewall is fitted (e.g., snap fit by a detent bead 286 and slot 288 (FIG. 19) feature) within the main wall portion of the cup. The sidewall may thus have ports 290, 292 complementary to the ports in the cup outer wall main portion. The exemplary lid also has downwardly-open radial channels 298, 300, 302 (FIG. 16) for capturing upper portions of the walls 258, 260, 262. The exemplary lid also includes a central aperture boss 304 surrounding the upper portion of the inner sidewall of the cup and having ports 306, 307 complementary to the ports 266, 267 therein.

The exemplary third piece 226 is a selector which functions as a rotary valve element selectively blocking and unblocking the inboard (inlet) and outboard (outlet) ports. The exemplary selector includes a central hollow shaft 420 extending through the central aperture boss in the lid within the inner wall of the cup and having a barb 422 to axially capture the selector.

The exemplary selector shaft comprises a pair of axial slots 424, 426 for flexibility. One of the slots (e.g., 424) is slightly wider and serves as an opening for passing material into the dispensing compartments/chambers with adjacent intact portions 430, 432 of the shaft selectively blocking the ports in the inner wall of the cup. At the upper end of the shaft, a partial upper web portion 440 extends to a partial sidewall 442 (e.g., having a pair of diametrically opposite portions 442-1, 442-2 and bears a protruding user grip 444 and indicator feature 446).

In the exemplary embodiment, the selector sidewall portions are positioned and dimensioned to cooperate with the ports of the cup outer wall for selectively exposing one or both of the two dispensing chambers. In an exemplary configuration, the sidewall 442 of the selector is dimensioned so that its inner diameter (ID) surface may ride in close facing engagement with the outer diameter (OD) surface of the cup main sidewall portion 272. In this exemplary embodiment, to facilitate sealing, the main portion 272 has a slightly protruding area surrounding the outlet ports 340 and 342 so as to locally seal with the sidewall 442. In the exemplary closed condition of FIG. 20, the sidewall portion 442-1 blocks both ports 340, 342. Meanwhile, an intact portion of the shaft 420 blocks the chamber inlet ports. Overall, the chamber inlet ports are respectively formed by the combination of port 266 and port 306 for the first chamber 262 and port 267 and port 307 for the second chamber 264. Although this exemplary condition of FIG. 20 is shown with a dose in the chamber 264 (e.g., as might represent a storage condition after a use which depleted the chamber 262 and filled the chamber 264), alternative situations may involve both chambers being empty or both chambers being full.

Entering the free-pouring condition may comprise rotating the selector by 180° about the axis 500 from the closed condition. The exemplary sidewall portion 442-2 includes a single large central aperture or opening 450. In the free-pouring condition (FIGS. 21 & 22), this aperture exposes both ports 340, 342.

When rotated slightly (to the FIG. 23/24 condition or the FIG. 25/26 condition) from the free-pouring condition to pour from either associated compartment/chamber (the pouring chamber), an intact portion 442-2A, 442-2B aside the opening 450 blocks the outlet of the other chamber (filling chamber) while the shaft slot 424 exposes the inlet of such filling chamber (the adjacent intact portion of the shaft blocking the inlet to the pouring chamber).

The wall segment 442-1 is intact and, when rotated 180° from the free-pouring condition to the closed condition blocks both outlets. The exemplary selector sidewall along one of its portions comprises a detent feature 470 which may cooperate with complementary detent features 472, 474, 476, 478 in the cup channel to detent in each of the four noted conditions. The exemplary feature on the sidewall is a projection engagable to complementary sockets 472, 474, 476, 478 molded in the cup. Each of the exemplary pieces is a single piece molding (e.g., polypropylene).

Although unitarily molded sealing features are shown in the form of mating surfaces of the moldings, other embodiments may include separate seals.

Either of these embodiments may be used in yet further applications. Several possible applications involve replacing pushbutton or other valves in liquid dispensing systems. One exemplary liquid dispensing system is large laundry detergent jugs (e.g., 90-200 fluid ounce range). Exemplary such jug bodies are molded with two threaded ports. A first port is covered by a cap. A second port is covered by a push button valve spout fitment. In a transport and storage condition, both ports are facing upward. For dispensing, the jug is placed on one end or side with the port axes oriented horizontally and the valved port near the bottom and the other port near the top. This allows removal or loosening of the cap at the top port to serve as a vent and the bottom port valve serves as a spigot. The bottom port may have a snap-on or screw-on dispensing cup/cover to be used for dispensing. Thus, the present systems may be applied to such a container. In this situation, in operational use, the container remains in its dispensing orientation and the fitment axis remains horizontal or very close thereto (e.g., within 10°). In such a system, a snap-on dispensing cup may also be provided as in the prior art.

A similar system might be used with a boxed product (e.g., a wine or other beverage box wherein the internal bladder contains the liquid).

In yet other implementations, rather than having the axis remain horizontal during stages of use, the axis may be vertical with the fitment inverted (e.g., at the bottom of a large reservoir). Other variations may have constant fitment axis orientations between horizontal and vertical.

One or more embodiments of the present invention have been described. Nevertheless, it will be understood that various modifications may be made without departing from the spirit and scope of the invention. For example, the nature of the particular product to be dispensed may influence details of any particular embodiment. The bottle body may be based on the overall configuration of an existing or yet-developed conventional bottle for such product. Tamper-evident features may also be included. Accordingly, other embodiments are within the scope of the following claims.

What is claimed is:

1. An apparatus comprising:
a bottle body having an interior for storing a flowable material;
a chamber body mounted to the bottle body and partially bounding a first chamber and a second chamber and having:
an opening; and
a spout; and
a selector mounted for rotation relative to the chamber body between a first dosing condition and a second dosing condition,
wherein:
in the first dosing condition:
flow is not blocked from the first chamber out the opening;
flow is blocked from the second chamber out the opening;
flow is blocked from the bottle interior to the first chamber; and
flow is not blocked from the bottle interior to the second chamber; and
in the second dosing condition:
flow is blocked from the first chamber out the opening;
flow is not blocked from the second chamber out the opening;
flow is not blocked from the bottle interior to the first chamber; and
flow is blocked from the bottle interior to the second chamber.

2. The apparatus of claim 1 wherein:
the selector is mounted for rotation relative to the chamber body between said first dosing condition, said second dosing condition, and a free-pouring condition; and
in the free-pouring condition, flow is not blocked from the bottle interior, through the first and second chambers and out the opening.

3. The apparatus of claim 2 wherein:
the selector is mounted for rotation relative to the chamber body between said first dosing condition, said second dosing condition, a closed condition; and in the closed condition, flow is blocked from the bottle interior into both the first and second chambers and is blocked from the first and second chambers out the opening.

4. The apparatus of claim 3 wherein:
the selector and chamber body combined to provide means for identifying each of the first dosing condition, second dosing condition, free-pouring condition, and closed condition.

5. The apparatus of claim 1 wherein:
the selector is mounted for rotation relative to the chamber body between said first dosing condition, said second dosing condition, a closed condition; and
in the closed condition, flow is blocked from the bottle interior into both the first and second chambers and is blocked from the first and second chambers out the opening.

6. The apparatus of claim 1 wherein:
a dose volume of the first chamber and of the second chamber is 15-75 ml.

7. The apparatus of claim 1 wherein:
a dose volume of the first chamber and of the second chamber is 20-40 ml.

8. The apparatus of claim 1 wherein:
the chamber body and selector are each a single separate piece assembled to each other.

9. The apparatus of claim 1 wherein:
the chamber body is threaded onto a neck of the bottle body.

10. The apparatus of claim 1 wherein:
the selector is held for rotation via a cooperating rib and channel.

11. The apparatus of claim 1 wherein:
the chamber body comprises vertical radial vanes between the inner wall, outer wall, and bottom wall, to define the first chamber and the second chamber.

12. The dispenser of claim 11 wherein:
the body is a single piece.

13. The apparatus of claim 1 wherein:
the bottle body is polyethylene; and
the chamber body and selector are polypropylene.

14. The apparatus of claim 1 wherein:
the chamber body comprises a two-piece assembly of a cup and a lid; and
the selector is a single separate piece assembled to the chamber body.

15. The apparatus of claim 1 further comprising:
a flowable material within the bottle body.

16. The apparatus of claim 1 wherein:
the bottle body interior has a volume of 0.4-2.0 l.

17. A method for using the apparatus of claim 1 comprising:
inclining the apparatus in the first dosing condition to pour a first dose of material from the first chamber and introduce a second dose of the material to the second chamber;
rotating the selector to the second dosing condition to isolate, relative to the bottle interior, the second chamber; and
inclining the bottle body in the second dosing condition to pour the second dose of material from the second chamber and replenish the first dose of the material in the first chamber.

18. The method of claim 17 further comprising:
rotating the selector to a free-pouring condition; and
in the free-pouring condition, inclining the bottle body to cause flow from the bottle interior, through the first and second chambers in parallel, and out the opening.

19. A method for manufacturing the apparatus of claim 1, the method comprising:
securing the chamber body to the bottle body; and
securing the selector to the chamber body.

20. The method of claim 19 wherein:
the securing of the chamber body comprises locking to prevent rotation and extraction; and
the securing of the selector comprises snapping onto the chamber body to permit rotation between at least said first dosing condition and second dosing condition.

* * * * *